(12) United States Patent
Bishop

(10) Patent No.: US 10,487,851 B2
(45) Date of Patent: Nov. 26, 2019

(54) GUIDE VANE ASSEMBLY WITH COMPENSATION DEVICE

(71) Applicant: Rolls-Royce Deutschland Ltd & Co KG, Blankenfelde-Mahlow (DE)

(72) Inventor: Jeff Bishop, Willington (GB)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 108 days.

(21) Appl. No.: 15/819,427

(22) Filed: Nov. 21, 2017

(65) Prior Publication Data
US 2018/0142706 A1    May 24, 2018

(30) Foreign Application Priority Data

Nov. 23, 2016 (DE) .......................... 10 2016 122 640

(51) Int. Cl.
   *F04D 29/56*  (2006.01)
   *F02C 7/042*  (2006.01)
   *F01D 17/16*  (2006.01)

(52) U.S. Cl.
   CPC ......... *F04D 29/563* (2013.01); *F01D 17/162* (2013.01); *F02C 7/042* (2013.01);
   (Continued)

(58) Field of Classification Search
   CPC ...... F04D 29/563; F01D 17/162; F02C 7/042; F05D 2220/32; F05D 2300/50212
   (Continued)

(56) References Cited

U.S. PATENT DOCUMENTS

| 4,812,106 A | * | 3/1989 | Purgavie | ............... F01D 17/162 |
| | | | | 415/139 |
| 5,211,537 A | * | 5/1993 | Langston | ................ F01D 9/042 |
| | | | | 415/209.2 |

(Continued)

FOREIGN PATENT DOCUMENTS

| DE | 102014219552 A1 | 3/2016 |
| EP | 1531237 A2 | 5/2005 |
| WO | WO2014052842 A1 | 4/2014 |

OTHER PUBLICATIONS

European Search Report dated Apr. 3, 2018 for counterpart European Patent Application No. 17202356.6.
(Continued)

*Primary Examiner* — Nathaniel E Wiehe
*Assistant Examiner* — David Whittaker
(74) *Attorney, Agent, or Firm* — Shuttleworth & Ingersoll, PLC; Timothy J. Klima

(57) ABSTRACT

A guide vane assembly, with at least one guide vane row and a housing for the at least one guide vane row that extends along a circumferential direction about a central axis. The at least one guide vane row comprises multiple guide vanes that are respectively mounted at the housing in an adjustable manner by means of an adjusting appliance of the guide vane assembly. The adjusting appliance comprises at least one adjusting element for adjusting the guide vanes that is arranged at a radial distance to an outer side of the housing with respect to the central axis. A compensation device is provided, via which a radial distance of the adjusting element to the outer side of the housing is predetermined, and the different thermal expansions of the adjusting element and of the housing are at least partially compensated for the purpose of maintaining these distances.

17 Claims, 7 Drawing Sheets

(52) U.S. Cl.
CPC ...... *F05D 2220/32* (2013.01); *F05D 2260/32* (2013.01); *F05D 2300/50212* (2013.01)

(58) Field of Classification Search
USPC ........................................................ 415/160
See application file for complete search history.

(56) References Cited

U.S. PATENT DOCUMENTS

| | | | |
|---|---|---|---|
| 7,396,203 B2 * | 7/2008 | Martindale | ............. F01D 25/24 |
| | | | 415/136 |
| 8,864,450 B2 * | 10/2014 | Gasmen | ................ F01D 17/162 |
| | | | 415/160 |
| 9,309,778 B2 | 4/2016 | Ress, Jr. | |
| 9,822,651 B2 * | 11/2017 | LeBlanc | ............... F01D 17/162 |
| 2005/0106010 A1 | 5/2005 | Evans | |
| 2014/0234082 A1 | 8/2014 | LeBlanc et al. | |
| 2016/0090856 A1 | 3/2016 | Klauke | |

OTHER PUBLICATIONS

German Search Report dated Jul. 18, 2017 for counterpart German Application No. 10 2016 122 640.8.

* cited by examiner

GUIDE VANE ASSEMBLY WITH COMPENSATION DEVICE

REFERENCE TO RELATED APPLICATION

This application claims priority to German Patent Application No. 10 2016 122 640.8 filed on Nov. 23, 2016, the entirety of which is incorporated by reference herein.

BACKGROUND

The invention in particular relates to a guide vane assembly.

In engines, for example turbomachines and in particular gas turbine engines, it is generally known to provide adjustable guide vanes for influencing the flow depending on the rotational speed of rotating rotor blades. In particular in gas turbine engines, usually adjustable guide vanes are used in the area of the compressor, wherein the guide vanes are adjusted depending on the compressor rotational speed. In the technical jargon, the adjustable guide vanes are referred to as variable stator vanes, or VSV in short.

Here, the adjustable guide vanes are usually arranged in the component of a guide vane row and inside a housing in which the rotating rotor blades are also arranged. In practice, the individual guide vanes are respectively mounted at the housing so as to be adjustable via a bearing journal. Provided inside the housing is usually a rotatable bearing of a guide vane at a hub, e.g. of a compressor. Each bearing journal is mounted in a rotatable manner at the housing in an associated bearing opening in the wall of the housing. At that, the bearing journal passes through this bearing opening along an extension direction of the bearing journal, so that an end of the bearing journal is accessible at an outer side of the housing for adjusting the corresponding guide vane by turning the bearing journal. At that, usually respectively one lever engages at a journal end which is affixed at an adjusting element in the form of an adjusting ring of an adjusting mechanism to simultaneously adjust multiple guide vanes by adjusting the adjusting element and multiple levers that are hinged thereat. Such a generic guide vane assembly with adjustable guide vanes for a compressor of a gas turbine engine is shown in U.S. Pat. No. 9,309,778 B2, for example. In practice, the bearing journals of the guide vanes, which are often also referred to as shingles, are provided in radially protruding sleeve-shaped bearing extensions of the housing. These bearing extensions are formed at a wall of the housing and ensure the rotatable mounting and support of the bearing journal.

The at least one adjusting element of the adjusting appliance provided for adjustment of the guide vanes is usually supported at an outer side of the housing and is adjustable relative to the same in the circumferential direction to cause a rotation of the guide vanes about their respective rotational axis. To keep the adjusting element in a defined radial distance to the outer side of the housing during that process, it is known to provide one or multiple compensation devices. Here, a compensation device is primarily provided for the purpose of avoiding that, during operation of the engine in which the housing is heated up stronger than the adjusting element depending on the respective cycle, the housing displaces the adjusting element radially outwards, and in this manner the adjusting precision of the adjusting element is reduced, or even a deformation or a jamming of the adjusting element occurs. A radial distance of the adjusting element to the outer side of the housing is predefined via a compensation device, and different thermal expansions of the adjusting element on the one hand and of the housing on the other are compensated to keep the adjusting element in a defined position relative to the housing, e.g. to keep a ring-shaped adjusting element centered with respect to the housing. For this purpose, for example multiple compensation devices are arranged in a manner distributed along the circumferential direction to support the adjusting element at different positions against the housing and center it with respect to the same.

What is for example known from DE 10 2014 219 552 A1 is a compensation device with a spacer that is supported in a compensation element in the form of a bushing. This bushing has a higher thermal expansion coefficient than the adjusting element and its spacer via which the adjusting element can be supported at an outer side of the housing. During operation of the engine, the housing of the guide vane assembly as well as the bushing functioning as a compensation element as well as the adjusting element are heated up. Here, the thermal expansion of the bushing leads to a radially outward displacement of the spacer attached thereat, while the thermal expansion of the adjusting element and of the spacer lead to a displacement radially inwards. Due to the higher thermal expansion coefficient of the bushing, what results is a temperature-related outward radial displacement of the spacer, which substantially corresponds to the radial elongation of the housing that occurs as a result of the temperature. The different thermal expansions of the housing and of the adjusting element are thus substantially compensated, and a radial distance between the spacer and the outer side of the housing is substantially kept constant. In this manner, a centering of the adjusting element with respect to the housing can also be maintained during operation of the engine.

However, in the guide vane assembly known from DE 10 2014 219 552 A1, the mounting of the compensation device is comparatively elaborate. In particular the spacer has to be positioned almost exactly relative to the bushing and the adjusting element to achieve the desired compensation. In addition, the bushing is inserted into a through bore of the adjusting element, so that when designing the individual components of the compensation device, it must in particular be taken into account with some effort as to what kind of heat transfer results between the adjusting element and the bushing placed herein.

SUMMARY

Thus, the invention is based on the objective to provide an improved guide vane assembly based on the state of the art described above.

This objective is achieved by means of the guide vane assembly with features as described herein.

A compensation device of a guide vane assembly according to the invention, by means of which different thermal expansions of an adjusting element for the adjustment of the guide vanes on the one hand and of a housing in which the guide vanes are mounted in a rotatable manner on the other hand can be at least partially compensated, defines a contact surface for the adjusting element and has a compensation element that is arranged between the adjusting element and the outer side of the housing. This compensation element is attached at the housing and, in the event of a thermal expansion in the circumferential direction, leads to a radial displacement of the contact surface for the adjusting element. What is thus achieved via the compensation element is a temperature-related displacement of a contact surface for the adjusting element in the radial direction, and namely with respect to the housing, so that a radial thermal expansion of the housing with respect to the adjusting element can be compensated in this manner, and a predetermined relative position of the adjusting element to the housing, for example a centering of the adjusting element with respect to the housing, is substantially maintained.

Accordingly, in one embodiment variant, the compensation device with the compensation element is embodied and arranged at the housing in such a manner that a temperature-related radial displacement of the contact surface with respect to the housing occurs counter to a radial thermal expansion of the housing. In other words, the compensation device and in particular the compensation element are designed in such a manner that thanks to them, when the temperature is increased, a radial distance of the contact surface with respect to the housing is decreased for the adjusting element, while the housing expands outwards in the radial direction (in the course of a thermal expansion). In reverse, a contraction of the housing in the radial direction in the event of a temperature drop (thermal contraction) is accompanied by a radially outward displacement of the contact surface with respect to the housing, so that a radial distance between the contact surface and the outer side of the housing is increased.

In one embodiment variant, the compensation element has a higher thermal expansion coefficient than the housing for the above-described temperature-controlled displacement of the contact surface. Accordingly, with an identical temperature change, the compensation element expands more strongly than the housing, so as to thus obtain at least a partial compensation of the different thermal expansions of the adjusting element, on the one hand, and of the housing, on the other.

For this purpose, the compensation device is constructed from at least two parts and, in addition to the compensation element, has a separate spacer element connected to the compensation element, with the contact surface being provided thereat. Thus, in this variant, the compensation element attached at the housing and usually being in direct contact with the housing is coupled in such a manner to the additional spacer element that the thermal expansion of the compensation element leads to a radial displacement of the contact surface of the additional spacer element. In this context, it is for example provided in one embodiment variant that the spacer element and the compensation element are embodied and connected to each other in such a manner that, in the event of a temperature-related elongation of the compensation element along the circumferential direction, a radial distance between the compensation element and a section of the spacer element, at which the contact surface for the adjusting element is provided is changed. Thus, in this variant, the spacer element, which may for example be extending longitudinally and have a longitudinal extension along the circumferential direction, expands at the circumferential side when the temperature is increased, and is connected to the spacer element in such a manner that the thermal expansion of the compensation element leads to a change in the radial distances between the compensation element and a section of the spacer element providing the contact surface, preferably for reducing this radial distance.

In particular for this purpose it can be provided that the compensation element attached at the housing has a higher thermal expansion coefficient than the spacer element. Thus, with the temperature change being the same, a thermal expansion at the compensation element will be stronger than at the spacer element. In this way, due to the expanding compensation element, a displacement movement of a section of the spacer element can be caused, which cannot be achieved or can hardly be achieved by a thermal expansion of the spacer element alone.

In principle, the contact surface for the adjusting element can be embodied and provided for the purpose of a section of the adjusting element abutting it directly at least temporary (depending on an operating cycle of the engine). However, in one variant, it is for example also possible that at least one additional sliding element is affixed (in an immobile manner) at the contact surface, and a section of the adjusting element can directly abut only this sliding element at least temporary.

In one embodiment variant, the compensation element is attached at the housing via at least one attachment element, which is guided through a passage hole of the spacer element—for example in the contact surface—during mounting of the compensation device to extend partially through an attachment opening of the compensation element and to fixedly attach the compensation element at the housing, for example by screwing the attachment element into the housing with an external thread.

To effect a displacement of the contact surface provided at a section of the spacer element by means of thermal expansion of the compensation element, it is useful to affix the spacer element itself not at the housing but only at the compensation element. For example, the spacer element is connected to the compensation element at least at two attachment locations that are arranged at a distance to each other in the circumferential direction. In one embodiment variant, this connection is established via at least one separate attachment element, such as for example a threaded bolt.

In a further development, the spacer element has at least two connecting arms for connecting to the compensation element, with a base body of the spacer element that is arranged at a radial distance to the compensation element with respect to the central axis extending radially in between them, at which the contact surface for the adjusting element is provided. Consequently, the compensation element and the spacer element connected therewith are present in an intermediate space between the adjusting element for adjusting the guide vanes and the housing at which the guide vanes are mounted in a rotatable manner, wherein, the base body of the spacer element is arranged with the contact surface radially further outside than the compensation element attached at the housing and with at least a small radial distance to the compensation element with respect to the central axis. Here, the base body of the spacer element can extend along the circumferential direction and, in the event of a thermal expansion of the compensation element, can be variable in its radial distance to the compensation element to thus displace the contact surface for the abutment and, if necessary, support of the adjusting element relative to the housing in a temperature-controlled manner.

In an exemplary embodiment, the spacer element is connected to the compensation element via four connecting arms that are arranged in pairs opposite each other at two side surfaces of the compensation element, wherein these side surfaces are facing away from each other with respect to the central axis of the guide vane assembly. For example, the base body of the spacer element extends along the circumferential direction from a first pair of connecting arms to a second pair of connecting arms, wherein, at each pair of connecting arms, a connecting arm is arranged at a first side of the compensation element and a different, opposite connecting arm is arranged at a different second side that is facing away from the first side of the compensation element. For fixedly attaching the spacer element at the compensation element and connecting the connecting arms to the compensation element, an attachment element such as a bolt, a screw or a rivet is provided, for example. In one embodiment variant, two opposite connecting arms of a pair of connecting arms are connected to each by means of an attachment element and affixed at the compensation element that extends through the compensation element. Here, the attachment element may for example extend in parallel to the central axis, through one or multiple through bores at the compensation element as well as two passage holes at opposite connecting arms to connect these connecting arms to the compensation element in a rigid or articulated manner according to the intended use.

For the radial displaceability of the base body of the spacer element comprising the contact surface via which the different thermal expansions of the adjusting element and of the housing of the guide vane assembly are to be compensated at least partially, the spacer element and the compensation element are embodied and connected to each other in such a manner in one embodiment variant that the base body of the spacer element, two connecting arms (of the at least two connecting arms) of the spacer element and the compensation element extend along the edges of a virtual trapezoidal contour, as viewed along the central axis. The previously mentioned elements and components of the compensation device thus define a trapezoidal contour, as viewed in one axial direction along the central axis. Depending on the temperature, this trapezoidal contour can be compressed or elongated (in the radial direction) via the thermal expansion or thermal contraction of the compensation element attached at the housing to compensate differently strong thermal expansions (expansion or contraction) of the housing and of the adjusting element of the guide vane assembly.

In this context, it is for example provided that the compensation element extends along a base of the virtual trapezoidal contour, the base body extends along the basic side of the virtual trapezoidal contour that is shorted with respect to the base, and the two connecting arms of the spacer element extend along two legs of the virtual trapezoidal contour. In principle, the virtual trapezoidal contour can correspond to the contour of an isosceles trapezoid. Accordingly, in the present case, the two connecting arms are embodied to be symmetrical to each other and in particular with the same effective length (between the base body of the spacer element and the compensation element).

In one embodiment variant, the compensation element is embodied in a tubular or sleeve-shaped manner, in particular for the purpose of weight reduction. Alternatively, the compensation element can for example be embodied in a longitudinally extending manner, but not hollow, e.g. in a bar-shaped manner.

In one embodiment variant in which no separate spacer element is provided, the contact surface for the adjusting element can be embodied by the compensation element itself. In particular in this variant, the compensation element may thus also have a lower thermal expansion coefficient than the housing at which it is attached.

At that, the contour of the compensation element can also be trapezoidal as viewed in a side view along the central axis of the guide vane assembly to elongate the compensation element via sections of the compensation element that are attached at the housing and arranged at a distance to each other along the circumferential direction in the event of a thermal expansion of the housing and a smaller thermal expansion of the compensation element. The trapezoidal contour is thus elongated along the circumferential direction, so that a further section of the compensation element that is arranged at a radial distance to the housing and at which the contact surface is provided and that is located between the sections attached at the housing, is radially displaced with respect to the housing and moved closer to the outer side of the housing. Thus, during thermal expansion of the housing, a radial height of the compensation element itself is reduced in the present case, and not, as in the above-described exemplary embodiments, the radial height of a separate spacer element that is connected to the compensation element. Rather, in this variant, the compensation element and a section of the housing at which it is attached extend along the edges of a virtual trapezoidal contour, wherein the section of the housing extends along a base of the trapezoidal contour, and two legs as well as a shorter basic side of the trapezoidal contour (with the contact surface for the adjusting element) opposite the base are defined by the compensation element.

In principle, the adjusting element can be supported at the compensation device and thus abut the contact surface that is provided by the compensation device, and can be radially displaced depending on the temperature.

Multiple compensation devices that are arranged at a distance to each other and respectively coupled to the housing can be provided along the circumferential direction in particular for maintaining a predetermined relative position of the adjusting element with respect to the housing, such as for example keeping the centering of a ring-shaped adjusting element with respect to the housing, even if different thermal expansions of the housing and of the adjusting element occur.

In principle, the adjusting element can be embodied as a one-piece or multi-piece adjusting ring via which multiple guide vanes can be adjusted jointly, preferably by adjusting the adjusting ring along the circumferential direction. Alternatively or additionally, the adjusting element can be embodied in a ring-segment-shaped or ring-shaped manner.

For example, a compensation element that can be combined with a spacer element is at least partially made of (stainless) steel, or has (stainless) steel as its manufacturing material. The spacer element can be made at least partially of titanium, in particular a titanium alloy, or the spacer element can have titanium, in particular a titanium alloy, as its manufacturing material at least partially. In an individual compensation element that has a lower thermal expansion coefficient as compared to the housing, the compensation element can be at least partially made of titanium, in particular a titanium alloy, or have titanium, in particular a titanium alloy, as its manufacturing material at least partially.

With the solution according to the invention, an engine, in particular a gas turbine engine, with at least one guide vane assembly according to the invention can be provided that facilitates an improved compensation of temperature-related and different thermal expansions of an adjusting element for adjusting guide vanes, on the one hand, and a housing for mounting the guide vanes, on the other.

BRIEF DESCRIPTION OF THE DRAWINGS

The attached Figures illustrate possible embodiment variants of the solution according to the invention by way of example.

DETAILED DESCRIPTION

Figure 7:
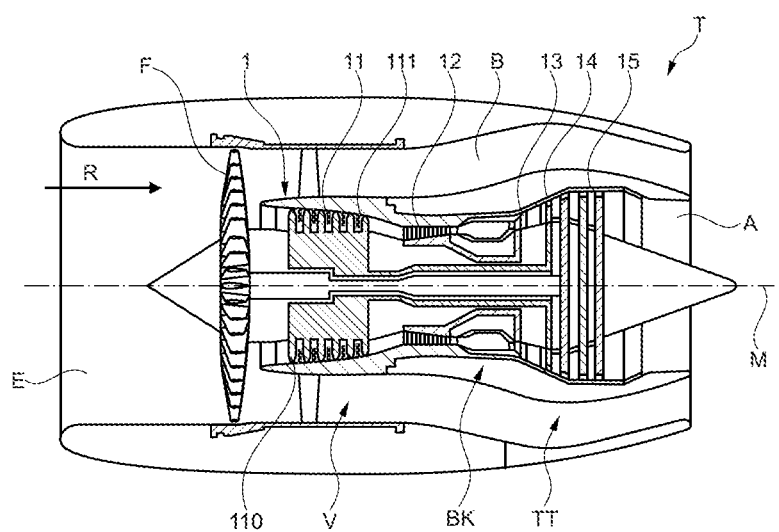
FIG. 7 shows, in sectional view and in a schematic manner, a gas turbine engine in which at least one guide vane assembly according to the invention is used.

FIG. 7 schematically illustrates, in a sectional rendering, a (gas) turbine engine T in which the individual engine components are arranged in succession along a central axis or rotational axis M. By means of a fan F, air is suctioned in along an entry direction E at an inlet or an intake E of the engine T. This fan F is driven via a shaft that is set into rotation by a turbine TT. Here, the turbine TT connects to a compressor V, which for example has a low-pressure compressor 11 and a high-pressure compressor 12, and where necessary also a medium-pressure compressor. The fan F supplies air to the compressor V, on the one hand, and, on the other hand, to a by-pass channel B for generating a thrust. The air that is conveyed via the compressor V is transported into the combustion chamber section BK where the driving power for driving the turbine TT is generated. For this purpose, the turbine TT has a high-pressure turbine 13, a medium-pressure turbine 14, and a low-pressure turbine 15. The turbine TT drives the fan F by means of the energy that is released during combustion in order to generate the necessary thrust by means of the air that is conveyed into the bypass channel B. The air is discharged from the bypass channel B in the area of an outlet A at the end of the engine T, where exhaust from the turbine TT flows outwards. Here, the outlet A usually has a thrust nozzle.

The compressor V comprises multiple rows of rotor blades 110 that are arranged behind each other in the radial direction, as well as rows of guide vanes 111 arranged in between them in the area of the low-pressure compressor 11. The rows of rotor blades 110 rotating about the central axis M and the rows of stationary guide vanes 111 are arranged alternatingly along the central axis M and accommodated inside a (compressor) housing 1 of the compressor V. The individual guide vanes 111 are mounted at the single-part or multi-part housing 1 in an adjustable manner—usually in addition to a radially inner bearing at the hub of the compressor V.

Figure 6:
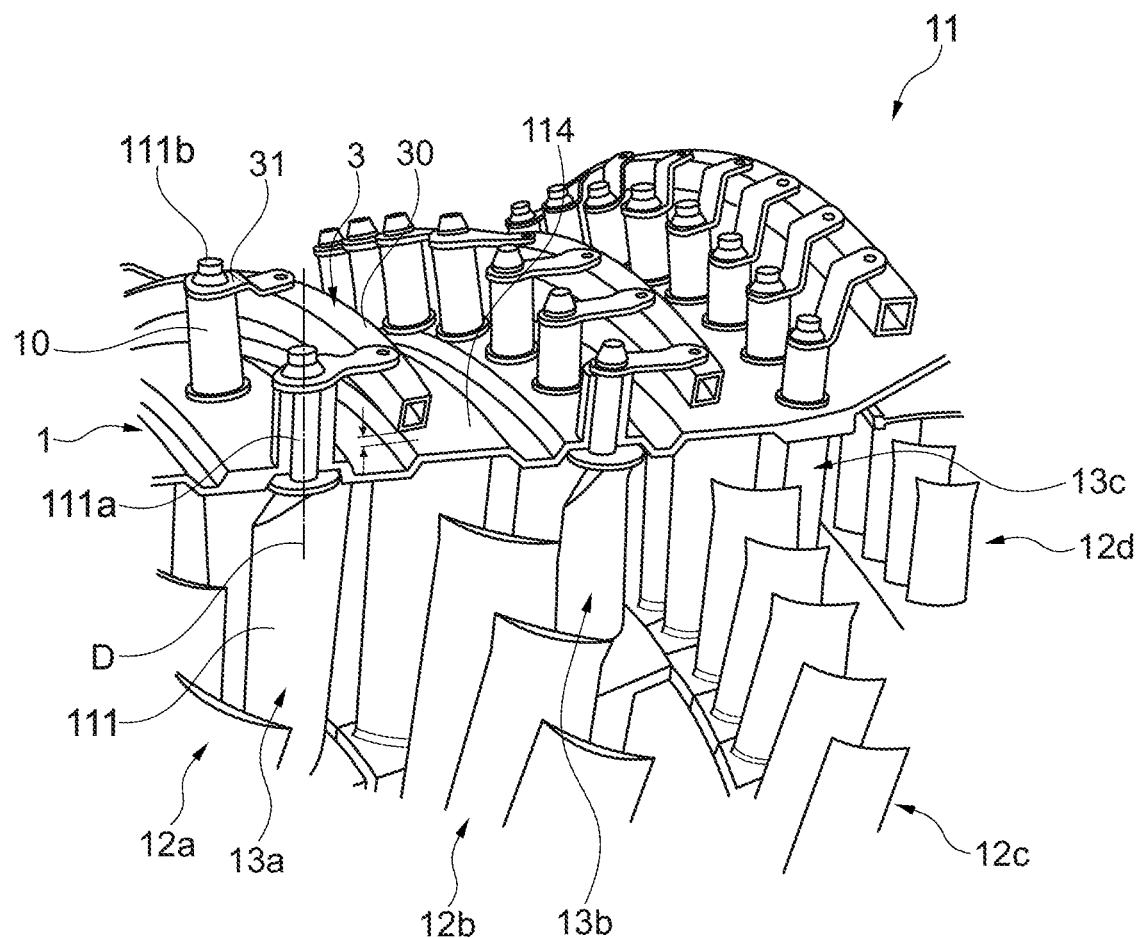
FIG. 6 shows, in sections and in a perspective view, an arrangement as it is known from the state of the art with multiple guide vane assemblies with respectively one guide vane row and multiple rotor blade assemblies.

Here, FIG. 6 shows, in sections and in greater detail, an arrangement of rotor blade rows 12a to 12d and guide vane rows 13a to 13c for the low-pressure compressor 11 as it is known from the state of the art. The guide vanes 111 of the guide vane rows 13a, 13b and 13c that are arranged behind each other are mounted at the housing 1 in an adjustable manner so that the position of the guide vanes 111 can be changed depending on the compressor's rotational speed.

For this purpose, a bearing journal 111a of each rotor blade 111 is mounted in a rotatable manner in a bearing opening that is embodied by a sleeve-shaped and radially outwardly protruding bearing extension 10 of the housing 1. Each bearing journal 111a is mounted and supported inside an associated bearing extension 10 so as to be rotatable about a rotational axis D. At that, each bearing journal 111a passes through an associated bearing extension 10, so that a journal end 111b projects from the bearing extension 10 at the outer side of the housing 1.

Thus, respectively one adjustment lever 31 of an adjusting appliance 3 can engage at the individual journal ends 111b to rotate the bearing journal 111a and thus change the position of the associated guide vane 111. Here, the levers 31 of a guide vane row 13a, 13b or 13c are respectively hinged at an adjusting element in the form of an adjusting ring 30 of the adjusting appliance 3. The adjusting ring 30, which is often comprised of multiple parts and divided into at least two segments, extends at the circumferential side along the outer shell surface of the housing 1. Thus, by adjusting the adjusting ring 30, the adjustment lever 31 hinged thereat as well as multiple, usually all, guide vanes 111 of a guide vane row 13a, 13b or 13c can be adjusted. At that, the individual adjusting rings 30 for the individual guide vane rows 13a, 13b and 13c are usually adjustable independently of each other.

An adjusting ring 30 is supported at an outer side of the housing 1, for example at a contact surface 114 that extends at the circumferential side. Here, the adjusting ring 30 is arranged at a radial distance a to the outer side of the housing 1, and in the present case to the contact surface 114, in the radial direction. This radial distance is predetermined by multiple compensation devices that are arranged in a distributed manner along the circumference and via which the adjusting ring 30 is supported at the outer side of the housing 1, and is to hold the adjusting ring 30 in a centered position with respect to the housing 1. However, during operation of the gas turbine engine T there is the difficulty that, due to the temperature, the housing 1 expands stronger radially outwards than the adjusting ring 30, depending on the respective (operational) cycle of the engine T. Thus, inaccuracies in the adjustment of the guide vanes 111 by means of the adjusting ring 30 or even a jamming or deformation of the adjusting ring 30 may occur. The solution according to the invention aims at remedying this problem, with possible embodiment variants being illustrated in more detail based on FIGS. 1, 2A to 2B, 3, 4 and 5A to 5B.

FIGS. 1, 2A-2B, 3 and 4 illustrate, in a synoptic view, a first embodiment variant of a guide vane assembly according to the invention L in which a compensation device 4 is constructed in multi-part design and in particular with a longitudinally extending compensation element 40 and a spacer element 41 that is attached thereat. The compensation element 40 is designed in a sleeve-shaped manner with a rectangular cross-section and is attached at the housing 1 at which the guide vanes 111 are mounted in a rotatable manner.

Here, the connection to the housing 1 is realized at a radially protruding mounting socket 1140 of the outer shell-surface 114 of the housing 1. Provided at this mounting socket 1140 are attachment openings 1140a and 1140b that are arranged at a distance to each other along the circumferential direction U, for example in the form of bore holes. A positioning pin 7 is inserted into the attachment opening 1140a as a positioning element. By means of this positioning pin 7, at which the mounting socket 1140 radially protrudes and meshes into one of two attachment openings 401.1, 401.2 at a bottom side 40B of the compensation element 40 that is facing towards the shell-surface 114 in the mounted state, the compensation element 40 can be attached at the housing 1 in a manner secured against loss, before final affixing is carried out by means of a separate attachment element in the form of a threaded bolt 60. This threaded bolt 60 passes through a passage hole 410b at the spacer element 41 as well as two opposite passage holes 400b and 400c at a top side 40A and bottom side 40B of the compensation element 40. For affixing the compensation element 40 at the housing 1, the threaded bolt 60 is screwed into the attachment opening 1140b of the mounting sockets 1140. Here, the threaded bolt 60 also passes a spacer sleeve 62 that is positioned inside the hollow compensation element 40 and between the passage holes 400b and 400c.

The passage hole 410b in the spacer element 41 of the compensation device 4 is embodied centrally at a base body 410 of the spacer element 41. This base body 410 forms a contact surface 410a, at which the adjusting ring 30 can abut and is locally supported—possibly by means of sliding elements that may be additionally attached thereat—in the mounted state of the guide vane assembly L according to the intended use.

Here, the spacer element 41 is connected to the compensation element 40 and designed in such a manner that, in the event of a temperature-related elongation of the compensation element 40 along the circumferential direction U, a radial distance b between the compensation element 40 and the base body 410 of the spacer element 41, at which the contact surface 410a for the adjusting ring 30 is provided, changes. For this purpose, the longitudinally extending spacer element 41 acting as a spacer has connection sections that are supported in a flexible manner opposite the base body 410 by means of respectively two lateral notches or recesses 43.1, 43.4 or 43.2, 43.3 having respectively two connecting arms 42.1, 42.4 or 42.2, 42.3.

Each pair of connecting arms 42.1, 42.4 or 42.2, 42.3 is connected to the compensation element 40 in a rigid or articulated manner at a longitudinal end of the compensation elements 40 via respectively one attachment element, here e.g. in the form of a threaded bolt 50a or 50b. Here, in the connected state, the connection arms 42.1, 42.4 or 2.2,42.3 are present facing each other in pairs at two side surfaces 40C and 40D of the compensation element 40, and thus along a connection axis 50a or 50b behind each other, so that the compensation element 40 is located between the respective pair of connecting arms 42.1, 42.4 or 42.2, 42.3. The threaded bolts 50a, 50b for the attachment of the connecting arms 42.1-42.4 respectively extend through the openings at the connecting arms 42.1, 42.4 or 42.2, 42.3, on the one hand, and, on the other, through connection openings 402.1, 402.4 or 402.2, 402.3 of the compensation element 40 that are aligned therewith. Nuts 51a, 51b are screwed on the threaded bolt 50a, 50b for fixation.

In the present case, the compensation element 40 has a lower thermal expansion coefficient than the housing 1 at which it is attached, and than the spacer element 41 at which the compensation element 40 is fixedly attached and is positioned with a base body 410 in the radial direction between the compensation element 40 and the adjusting ring 30. If the housing 1 expands in the radial direction during operation of the gas turbine engine T, this is accompanied by a stronger thermal expansion of the spacer element 40 along the circumferential direction U. In this temperature-related thermal expansion of the compensation element 40, the two pairs of connecting arms 42.1, 42.4 and 42.2, 42.3 of the spacer element 41 that are respectively fixedly attached at a longitudinal end of the spacer element 40, are displaced relative to each other. Here, the spacer element 41 and the compensation element 40 are embodied and connected to each other via the connecting arms 42.1-42.4 of the spacer element 41 in such a manner that the base body 410 of the spacer element 41, respectively two connecting arms 42.1, 42.2 or 42.3, 42.4 of the spacer element 41 that are arranged at a side surface 40C or 40D of the compensation element 40, and the compensation element 40 itself extend along the edges of a virtual trapezoidal contour TF, as viewed along the central axis M (cf. FIG. 1). In this way, the thermal expansion of the compensation element 40 and the accompanying relative displacement of the pairs of connecting arms 42.1, 42.4 and 42.2, 42.3 leads to a radial displacement of the base body 410 with the contact surface 410a relative to the compensation element 40, and thus in the radial direction relative to the outer shell surface 114 of the housing 1. This radial displacement of the contact surface 410a usually occurs counter to a radial expansion of the housing 1 and a radial expansion of the adjusting ring 30 (that is smaller by comparison). However, it principally depends on the (operational) cycle of the engine T. Consequently, in the event of a temperature-related thermal expansion of the housing 1 radially outwards, the radial distance b is reduced through the elongation of the trapezoidal contours TF along the circumferential direction U, and thus the contact surface 410a is moved closer to the shell-surface 114 of the housing 1. At that, the contact surface 410a for the adjusting ring 30 is displaced radially inwards, for example substantially by half the distance by which the housing 1 expands stronger radially outwards as compared to the adjusting ring 30 when the temperature is increased. Accordingly, different radial thermal expansions of the adjusting ring 30 and the housing 1 are at least partially compensated by the compensation device 4, and a centered position of the adjusting ring 30 to the housing 1 is maintained also during operation of the gas turbine engine T.

The degree of radial displaceability of the contact surface 410a for the adjusting ring 3 provided at the base body 410 can in particular be adjusted through the material thickness of the spacer element 41, which may for example be made of a (sheet) metal, the flexibility between the base body 41 and the connection sections of the spacer element 41 that respectively comprise a pair of connecting arms 42.1, 42.4 or 42.2, 42.3, and/or the degree of an angulation of the connecting arms 42.1-42.4 relative to the base body 41.

Figure 1:
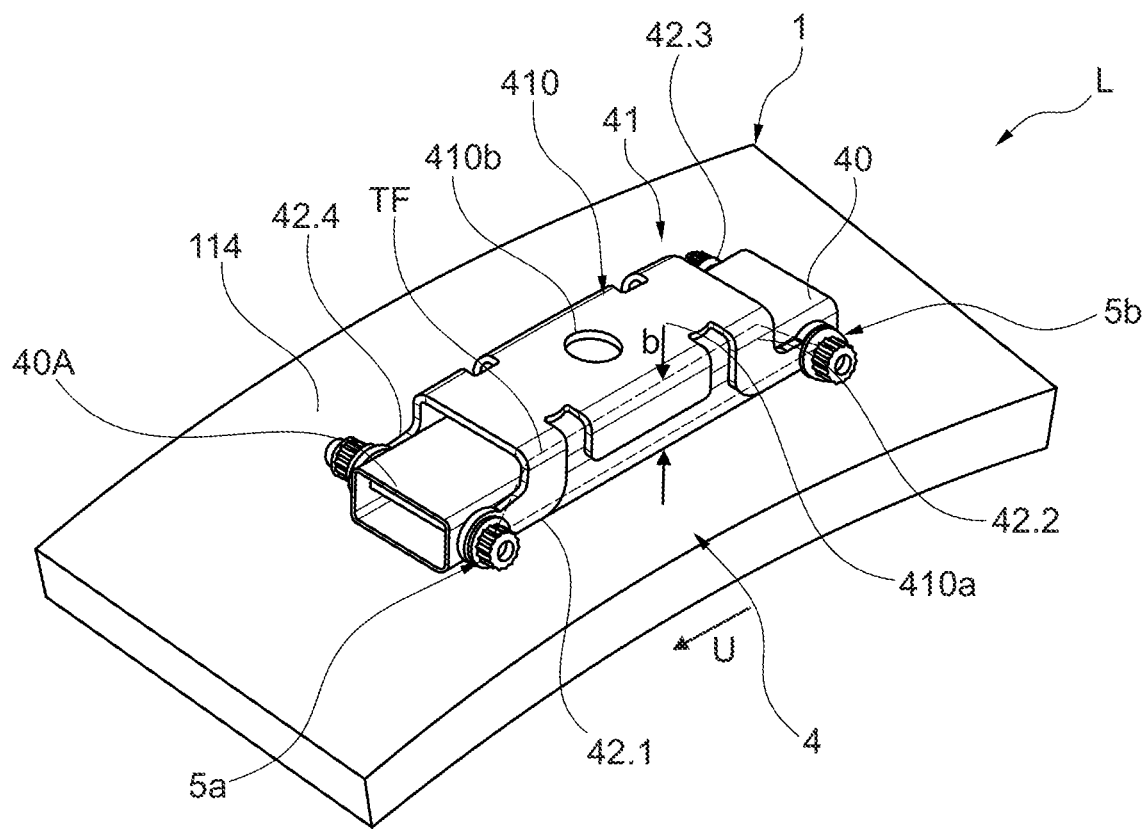
FIG. 1 shows, in sections, a first embodiment variant of a guide vane assembly according to the invention with a compensation device in multi-part design, comprising a compensation element and a spacer element that overlaps with the same radially outside at least partially.
Figure 2A:
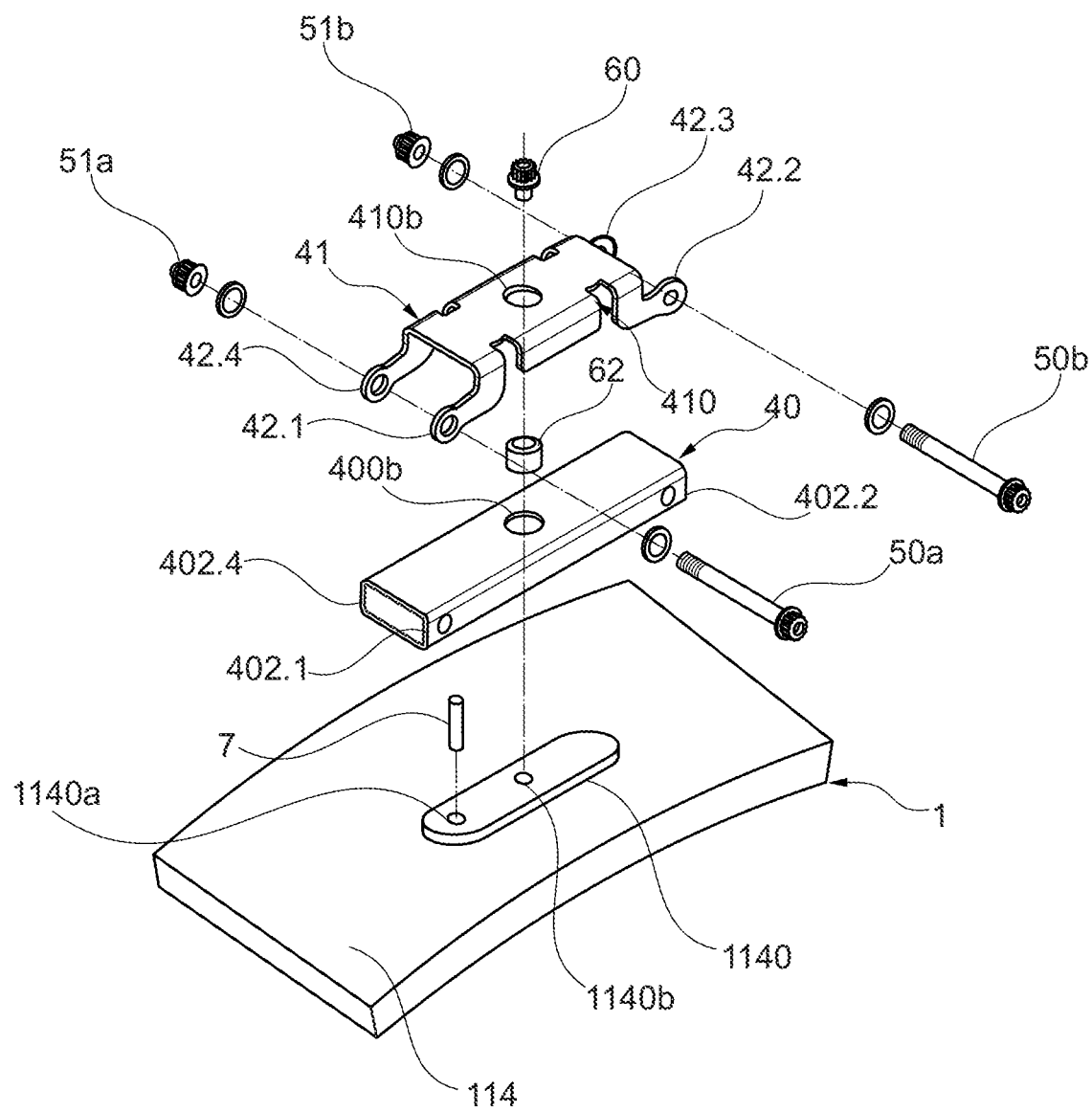
FIGS. 2A-2B show exploded views of the compensation device of FIG. 1.
Figure 2B:
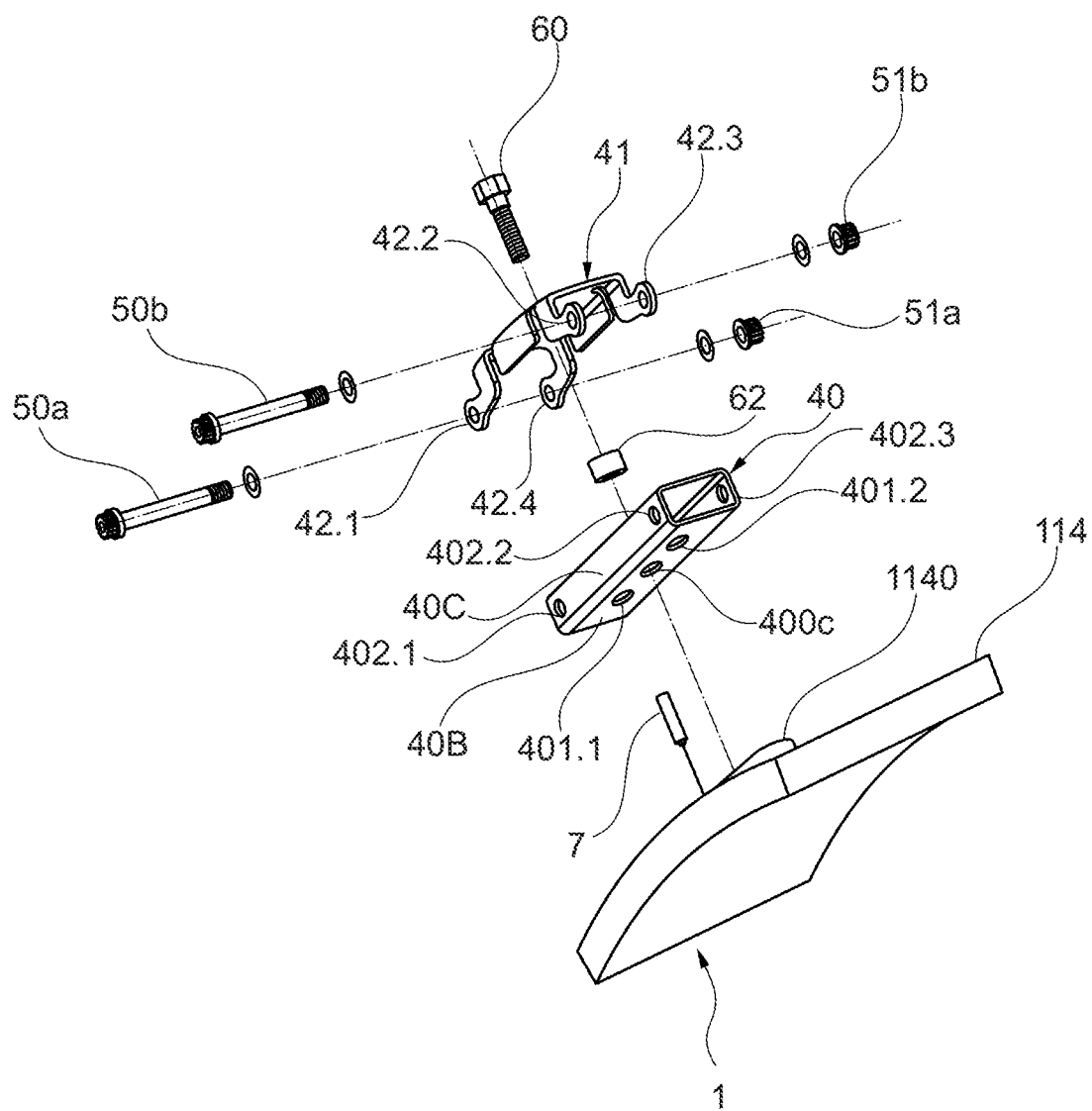
Figure 3:
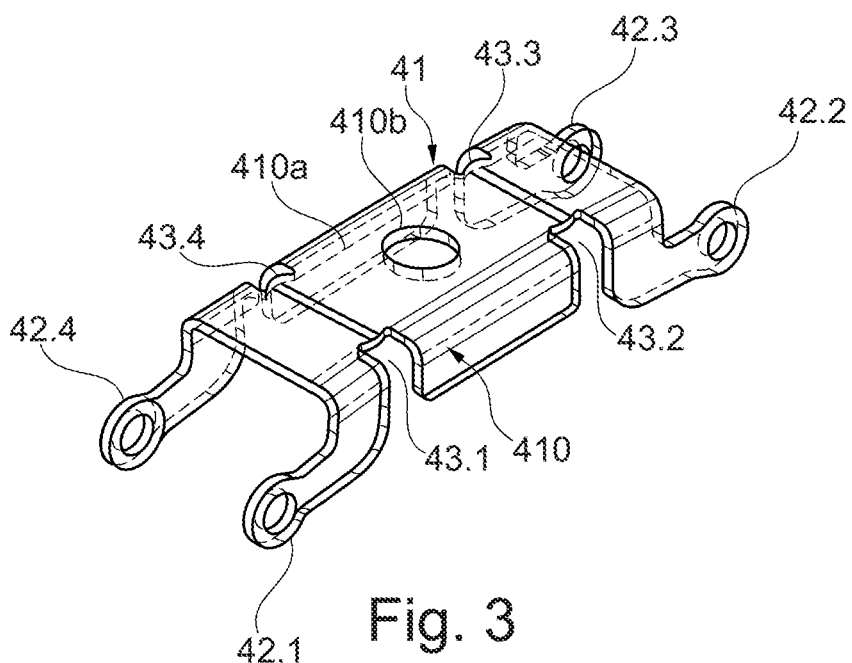
FIG. 3 shows a perspective detail drawing of the spacer element.
Figure 4:
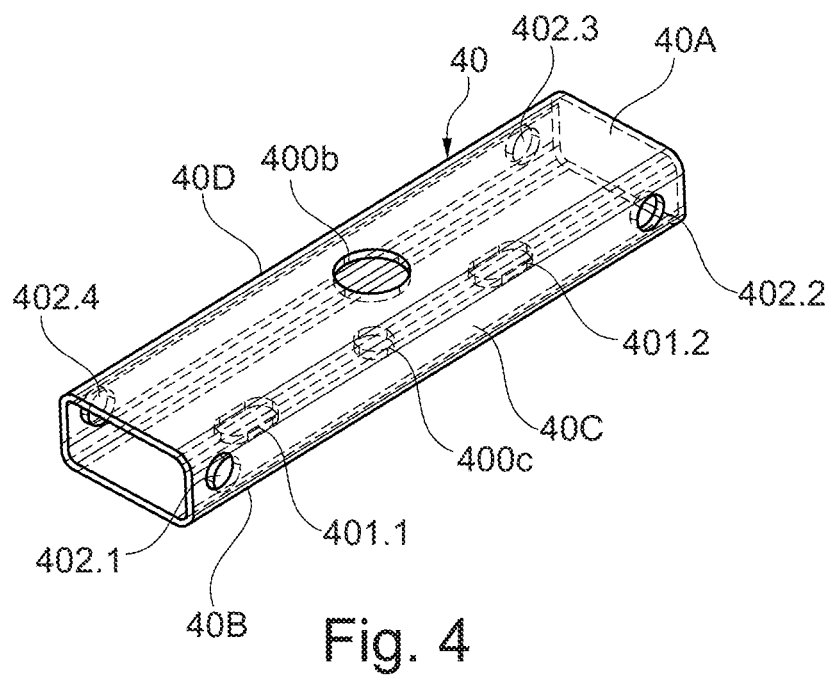
FIG. 4 shows a perspective detail drawing of the compensation element.
Figure 5A:
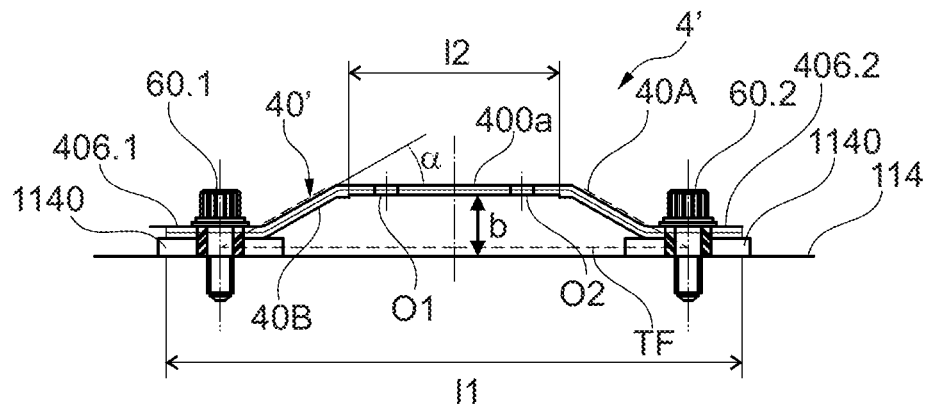
FIGS. 5A-5B show, in sections, a second embodiment variant of a guide vane assembly according to the invention with a single compensation element for defining a virtual trapezoidal contour.
Figure 5B:
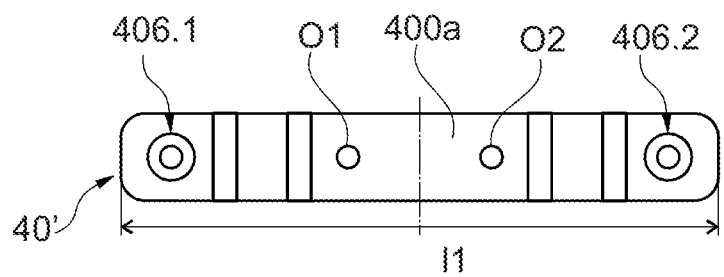

A further embodiment variant of a guide vane assembly L according to the invention, in which a compensation device 4' has only single spacer element 40', is illustrated in sections based on the sectional view of FIG. 5A and the top view of FIG. 5B. As shown in FIG. 5A, in the mounted state according to the intended use, the compensation element 40' defines a trapezoidal contour together with the section of the housing 1 at which the compensation element 40' is fixedly attached, as seen in a side view along the central axis M. At that, the compensation element 40', which extends longitudinally along the circumferential direction U and is for example made of a titanium alloy, has a length of l1 auf. Embodied between two attachment sections 406.1 and 406.2 of the compensation element 40' that are provided at the longitudinal end of the compensation element 40', is a section that projects radially outwards in an elevated manner and forms the contact surface 400a for the adjusting ring 30 at a top side 40A of the compensation element 40'. This (middle) section of the compensation element 40' that is provided with the contact surface 400a has a smaller l2 (l2>l1), and is positioned at a radial distance b to the outer shell surface 114 of the housing 1 when the compensation element 40' is affixed at the housing 1 according to the intended use.

Here, the affixing realized via respectively one attachment element in the form of a threaded bolt 60.1 or 60.2. Each of these threaded bolts 60.1, 60.2 is guided through a passage hole in the associated attachment section 406.1 or 406.2 and screwed into a mounting socket 1140 of the housing 1 that is projecting at the shell-surface 114.

At the symmetrically designed compensation element 40', the middle section with the contact surface 400a is connected on both sides along the circumferential direction U to a respective attachment section 406.1 or 406.2 via respectively one lateral section. The lateral section of the compensation element 40' is angled at an angle α to the middle section in the direction of the housing 1. For example, the angle α is in the range of 15° to 25°, for example at approximately 20°. When affixed at the housing 1 according to the intended use, the compensation element 40 defines a virtual trapezoidal contour TF together with the section of the housing 1 at which it is attached, with the section of the housing 1 extending along a base of the trapezoidal contour TF, and two legs as well as a shorter basic side of the trapezoidal contour TF that lies opposite the base are defined by the compensation element 40', namely by the middle section comprising the contact surface 400a and the two angled sections that laterally connect therewith Besides, to be able to provide an additional sliding element for placement of the adjusting ring 30 at the contact surface 400a, through bores O1 and O2 are provided at the middle section of the compensation element 40'. A corresponding sliding element can be attached thereat to provide it at the contact surface 400a.

PARTS LIST 1 housing
10 bearing extension
11 low-pressure compressor
110 rotor blade
111 guide vane
111a bearing journal
111b journal end
114 shell surface
1140 mounting socket
1140a, 1140b attachment opening
12 high-pressure compressor
12a-12d rotor blade row
13 high-pressure turbine
13a-13c guide vane row
14 medium-pressure turbine
15 low-pressure turbine
3 adjusting appliance
30 adjusting ring (adjusting element)
31 adjustment lever
4, 4' compensation device
40, 40' compensation element
400a contact surface
400b, 400c passage hole
401.1, 401.2 bearing opening
402.1-402.4 connection opening
406.1, 406.2 attachment sectiont
40A top side
40B bottom side
40C, 40D side surface
41 spacer element
410 base body
410a contact surface
410b passage hole
42.1-42.4 connecting arm
43.1-43.4 notch/recess
50a, 50b threaded bolt (attachment element)
51a, 51b nut
5a, 5b connection axis
60 threaded bolt (attachment element)
60.1, 60.2 threaded bolt (attachment element)
62 spacer sleeve
7 positioning pin (positioning element)
A outlet
a distance
B by-pass channel
b distance
BK combustion chamber section
D rotational axis/spindle axis
E inlet/intake
F fan
L guide vane assembly
l1,l2 length
M central axis/rotational axis
O1, O2 through bore
R entry direction
T gas turbine engine
TT turbine
U circumferential direction
V compressor
α angle

The invention claimed is:

1. A guide vane assembly comprising:
at least one guide vane row and a housing for the at least one guide vane row extending along a circumferential direction about a central axis, wherein the at least one guide vane row comprises multiple guide vanes that are respectively mounted at the housing in an adjustable manner by an adjusting appliance of the guide vane assembly,
the adjusting appliance including an adjusting element for adjusting the multiple guide vanes that is arranged at a radial distance to an outer side of the housing with respect to the central axis,
a compensation device by which a radial distance of the adjusting element to the outer side of the housing is predetermined, and different thermal expansions of the adjusting element, on one hand, and of the housing, on the other hand, are at least partially compensated,
the compensation device including a contact surface for the adjusting element and a compensation element arranged between the adjusting element and the outer side of the housing and that is attached at the housing and, in an event of a thermal expansion in the circumferential direction, leads to a radial displacement of the contact surface for the adjusting element,
wherein the compensation device includes at least two parts and, in addition to the compensation element includes a separate spacer element which is connected to the compensation element, the contact surface being positioned on the spacer element,
wherein the spacer element and the compensation element are shaped and connected to each other such that, in an event of a temperature-related elongation of the compensation element along the circumferential direction, a radial distance between the compensation element and a section of the spacer element, at which the contact surface is positioned, changes.

2. The guide vane assembly according to claim 1, wherein the compensation element has a higher thermal expansion coefficient than the housing.

3. The guide vane assembly according to claim 1, wherein the compensation element has a higher thermal expansion coefficient than the spacer element.

4. The guide vane assembly according to claim 1, wherein the spacer element is connected to the compensation element at least at two attachment locations that are arranged at a distance to each other in the circumferential direction.

5. The guide vane assembly according to claim 4, wherein the spacer element includes a base body and at least two connecting arms for connecting to the compensation element, with the base body, which is arranged at a radial distance to the compensation element with respect to the central axis and at which the contact surface is positioned, extending in between the at least two connecting arms.

6. The guide assembly according to claim 5, wherein the at least two connecting arms includes four connecting arms and the spacer element is connected to the compensation element via the four connecting arms that are arranged in pairs opposite each other at two side surfaces of the compensation element that are facing away from each other with respect to the central axis.

7. The guide vane assembly according to claim 5, wherein the spacer element and the compensation element are embodied and connected to each other such that the base body, two of the at least two connecting arms of the spacer element and the compensation element extend along edges of a virtual trapezoidal contour, as viewed along the central axis.

8. The guide vane assembly according to claim 7, wherein the compensation element extends along a base of the virtual trapezoidal contour, the base body extends along a basic side that is shorter as compared to the base of the virtual trapezoidal contour, and the two of the at least two connecting arms extend along two legs of the virtual trapezoidal contour.

9. The guide vane assembly according to claim 7, wherein the virtual trapezoidal contour corresponds to a contour of an isosceles trapezoid.

10. The guide vane assembly according to claim 1, wherein the compensation element is at least one chosen from bar-shaped, tubular or sleeve-shaped.

11. The guide vane assembly according to claim 1, and further comprising at least one chosen from 1) wherein the compensation element has a lower thermal expansion coefficient than the housing and 2) the compensation element forms the contact surface for the adjusting element.

12. The guide vane assembly according to claim 11, wherein the compensation element and a section of the housing at which the compensation element is attached extend along edges of a virtual trapezoidal contour, wherein the section of the housing extends along an edge of a base of the trapezoidal contour, and two legs and a shorter basic side of the trapezoidal contour that is positioned opposite the base are defined by the compensation element.

13. The guide vane assembly according to claim 1, wherein the compensation element and a section of the housing at which the compensation element is attached extend along edges of a virtual trapezoidal contour, wherein the section of the housing extends along an edge of a base of the trapezoidal contour, and two legs and a shorter basic side of the trapezoidal contour that is positioned opposite the base are defined by the compensation element.

14. The guide vane assembly according to claim 1, wherein the adjusting element is supported at the compensation device.

15. The guide vane assembly according to claim 1, wherein the adjusting element is embodied as at least one chosen from a one-piece adjusting ring, a multi-piece adjusting ring, ring-segment-shaped and ring-shaped.

16. An engine with at least one guide vane assembly according to claim 1.

17. The guide vane assembly according to claim 1, and further comprising a plurality of the compensation device arranged at a distance to each other along the circumferential direction and respectively coupled with the housing.

* * * * *